(12) United States Patent
Tao et al.

(10) Patent No.: US 10,969,498 B2
(45) Date of Patent: Apr. 6, 2021

(54) VEHICLE POSITIONING METHOD, APPARATUS AND DEVICE

(71) Applicant: BEIJING BAIDU NETCOM SCIENCE TECHNOLOGY CO., LTD., Beijing (CN)

(72) Inventors: Sheng Tao, Beijing (CN); Zeshu Shen, Beijing (CN); Huo Cao, Beijing (CN); Yifeng Shi, Beijing (CN); Lei Fang, Beijing (CN); Haisong Wang, Beijing (CN); Ji Tao, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 208 days.

(21) Appl. No.: 16/149,014

(22) Filed: Oct. 1, 2018

(65) Prior Publication Data
US 2019/0302275 A1 Oct. 3, 2019

(30) Foreign Application Priority Data
Mar. 30, 2018 (CN) .......................... 201810290353.8

(51) Int. Cl.
*G01S 19/46* (2010.01)
*H04W 4/44* (2018.01)
(Continued)

(52) U.S. Cl.
CPC .............. *G01S 19/46* (2013.01); *G01S 19/11* (2013.01); *G08G 1/0116* (2013.01); *H04W 4/44* (2018.02)

(58) Field of Classification Search
CPC .......... G01S 19/46; G01S 19/11; G01S 19/05; G01S 19/48; G08G 1/0116; H04W 4/44
(Continued)

(56) References Cited

U.S. PATENT DOCUMENTS

2015/0091790 A1* 4/2015 Forutanpour ........... G06F 3/015
                                                              345/156
2017/0169300 A1* 6/2017 Heisele .................... G06T 7/74
(Continued)

FOREIGN PATENT DOCUMENTS

| CN | 104748755 A | 7/2015 |
| CN | 105866731 A | 8/2016 |
| CN | 106710281 A | 5/2017 |

OTHER PUBLICATIONS

The Chinese First Examination Report of corresponding Chinese application No. 201810290353.8, dated May 30, 2019.

*Primary Examiner* — Harry K Liu
(74) *Attorney, Agent, or Firm* — J.C. Patents

(57) ABSTRACT

Provided are a vehicle positioning method, an apparatus and a device. The method includes: sending an auxiliary positioning request to an auxiliary positioning device within a preset distance range; receiving an auxiliary positioning message returned by the auxiliary positioning device with respect to the auxiliary positioning request, where the auxiliary positioning message carries location information of the auxiliary positioning device; and determining a current location of a current vehicle according to the location information of the auxiliary positioning device and distance information between the current vehicle and the auxiliary positioning device. The method of the present disclosure can implement vehicle positioning without a satellite positioning signal. The vehicle positioning can be performed when the vehicle is blocked by an obstacle such as a tunnel, a building and the satellite positioning signal cannot be received, improving the accuracy of the vehicle positioning.

19 Claims, 9 Drawing Sheets

(51) Int. Cl.
*G01S 19/11* (2010.01)
*G08G 1/01* (2006.01)

(58) Field of Classification Search
USPC .................................................... 342/357.29
See application file for complete search history.

(56) References Cited

U.S. PATENT DOCUMENTS

| | | |
|---|---|---|
| 2017/0227647 A1* | 8/2017 | Baik ........................ G01S 19/42 |
| 2017/0262709 A1* | 9/2017 | Wellington ........... G05D 1/0088 |
| 2017/0279858 A1* | 9/2017 | Atarius ................. H04L 12/189 |
| 2018/0075309 A1* | 3/2018 | Sathyanarayana ..... H04N 5/247 |
| 2018/0106618 A1* | 4/2018 | Cerchio ................ G01S 5/0252 |
| 2018/0124771 A1* | 5/2018 | Mok ................... H04W 72/048 |
| 2018/0367958 A1* | 12/2018 | Dizdarevic ............. G08G 1/091 |
| 2019/0041867 A1* | 2/2019 | Graefe ................ G08G 1/0141 |
| 2019/0238658 A1* | 8/2019 | Shimizu .................. H04W 4/80 |
| 2019/0302220 A1* | 10/2019 | Kumar ................... H04W 4/44 |

\* cited by examiner

VEHICLE POSITIONING METHOD, APPARATUS AND DEVICE

CROSS-REFERENCE TO RELATED APPLICATION

This application claims priority to Chinese Patent Application No. 201810290353.8, filed on Mar. 30, 2018, which is hereby incorporated by reference in its entirety.

TECHNICAL FIELD

The present disclosure relates to the field of vehicle positioning technologies and, in particular, to a vehicle positioning method, an apparatus and a device.

BACKGROUND

Autonomous vehicles or self-piloting automobiles, which are also known as driverless vehicles, computer-driven cars, or wheeled mobile robots, are smart cars that are unmanned by computer systems. Vehicle positioning plays an important role in the commercialization of autonomous vehicles. Only by accurately locating a current location of the vehicle can a path planning be carried out according to a corresponding high-precision map.

The existing vehicle positioning methods for autonomous vehicles use a Global Navigation Satellite System (GNSS) to determine a specific location of the vehicle. For example, a Global Positioning System (GPS), a Beidou Navigation Satellite System and a GLONASS Navigation Satellite System, and the like, may be used to provide positioning, navigation and timing services for all types of users all weather and around the clock all over the world. However, in places such as tunnels, urban roads with dense buildings or avenues, the vehicle is blocked by an obstacle such as a tunnel, a building, resulting in that the vehicle fails to receive a satellite positioning signal or the satellite positioning signal is weak, and thus the positioning of the vehicle is inaccurate, or even it is impossible to perform vehicle positioning.

SUMMARY

The present disclosure provides a vehicle positioning method, an apparatus and a device for solving the problem that the vehicle is blocked by an obstacle such as a tunnel, a building, resulting in that the vehicle fails to receive a satellite positioning signal or the satellite positioning signal is weak, and thus the positioning of the vehicle is inaccurate, or even it is impossible to perform positioning.

A first aspect of the present disclosure is to provide a vehicle positioning method, including:

sending an auxiliary positioning request to an auxiliary positioning device within a preset distance range;

receiving an auxiliary positioning message returned by the auxiliary positioning device with respect to the auxiliary positioning request, where the auxiliary positioning message carries location information of the auxiliary positioning device; and determining a current location of a current vehicle according to the location information of the auxiliary positioning device and distance information between the current vehicle and the auxiliary positioning device.

A second aspect of the present disclosure is to provide a vehicle positioning method, including:

detecting signal characteristic information of a current location;

performing, according to the signal characteristic information of the current location, a matching operation with signal characteristic information of location points on a signal characteristic value map; and determining the current location according to a location of a location point determined by the matching operation.

A third aspect of the present disclosure is to provide a vehicle positioning apparatus, including:

a sending module, configured to send an auxiliary positioning request to an auxiliary positioning device within a preset distance range;

a receiving module, configured to receive an auxiliary positioning message returned by the auxiliary positioning device with respect to the auxiliary positioning request, where the auxiliary positioning message carries location information of the auxiliary positioning device; and a positioning module, configured to determine a current location of a current vehicle according to the location information of the auxiliary positioning device and distance information between the current vehicle and the auxiliary positioning device.

A fourth aspect of the present disclosure is to provide a vehicle positioning apparatus, including:

a detecting module, configured to detect signal characteristic information of a current location;

a matching module, configured to perform, according to the signal characteristic information of the current location, a matching operation with signal characteristic information of location points on a signal characteristic value map; and a positioning module, configured to determine the current location according to a location of a location point determined by the matching operation.

A fifth aspect of the present disclosure is to provide an on board device, including:

a memory, a processor, and a computer program stored on the memory and operable on the processor, where the processor implements the method according to the first aspect described above when running the computer program.

A sixth aspect of the present disclosure is to provide an on board device, including:

a memory, a processor, and a computer program stored on the memory and operable on the processor, where the processor implements the method according to the second aspect described above when running the computer program.

A seventh aspect of the present disclosure is to provide a computer readable storage medium, having a computer program stored thereon, for implementing the method according to the first aspect described above when executed by a processor.

An eighth aspect of the present disclosure is to provide a computer readable storage medium, having a computer program stored thereon, for implementing the method according to the second aspect described above when executed by a processor.

The vehicle positioning method, apparatus and device provided by the present disclosure, by obtaining, by the current vehicle, location information of a surrounding auxiliary positioning device by using a wireless communication function, and calculating the current location of the current vehicle according to the location information of the auxiliary positioning device and distance information between the current vehicle and the auxiliary positioning device, can implement vehicle positioning without a satellite positioning signal. The vehicle positioning can be performed when the vehicle is blocked by an obstacle such as a tunnel, a building and the satellite positioning signal cannot be received, improving the accuracy of the vehicle positioning.

BRIEF DESCRIPTION OF THE DRAWINGS

Accompanying drawings, which are incorporated into and constitute a part of the present specification, illustrate embodiments consistent with the present disclosure and serve to explain the principles of the present disclosure together with the specification.

Through the above drawings, specific embodiments of the present disclosure have been shown, and a more detailed description will be given below. These drawings and text descriptions are not intended to limit the scope of the present disclosure in any way, but to explain the concept of the present disclosure for those skilled in the art by referring to specific embodiments.

DESCRIPTION OF EMBODIMENTS

Exemplary embodiments will be described in detail herein, examples of which are illustrated in the accompanying drawings. When the following description refers to the accompanying drawings, unless otherwise indicated, like numerals in different drawings indicate the same or similar elements. Embodiments described in the following exemplary embodiments do not represent all embodiments consistent with the present disclosure. Instead, they are merely examples of apparatus and method consistent with some aspects of the disclosure as detailed in the appended claims.

First, the terms involved in the present disclosure are explained as follows:

Road Side Unit (RSU): including a traffic information collection unit or a traffic facility control unit that is deployed in the vicinity of a road, where the former provides collected traffic information to a traffic control device, and the latter implements a control instruction that a traffic control unit applies on a traffic facility.

On Board Unit (OBU): an apparatus that is disposed in a vehicle and can communicate with the RSU.

Host Vehicle (HV): referring to a target vehicle which is equipped with an on board unit and runs applications.

Remote Vehicle (RV): referring to a background vehicle that can cooperate with a host vehicle and broadcast V2X information regularly.

Autonomous Vehicle (AV): referring to a smart car that realizes driverless driving.

Moreover, the terms "first", "second", and the like are used for descriptive purposes only, and are not to be construed as indicating or implying a relative importance or implicitly indicating the number of technical features indicated. In the following description of the various embodiments, the meaning of "a plurality of" is two or more unless specifically defined otherwise.

The following several specific embodiments may be combined with each other, and the same or similar concepts or processes may not be described in some embodiments. Embodiments of the present disclosure will be described below in conjunction with the accompanying drawings.

Embodiment 1

Figure 1:
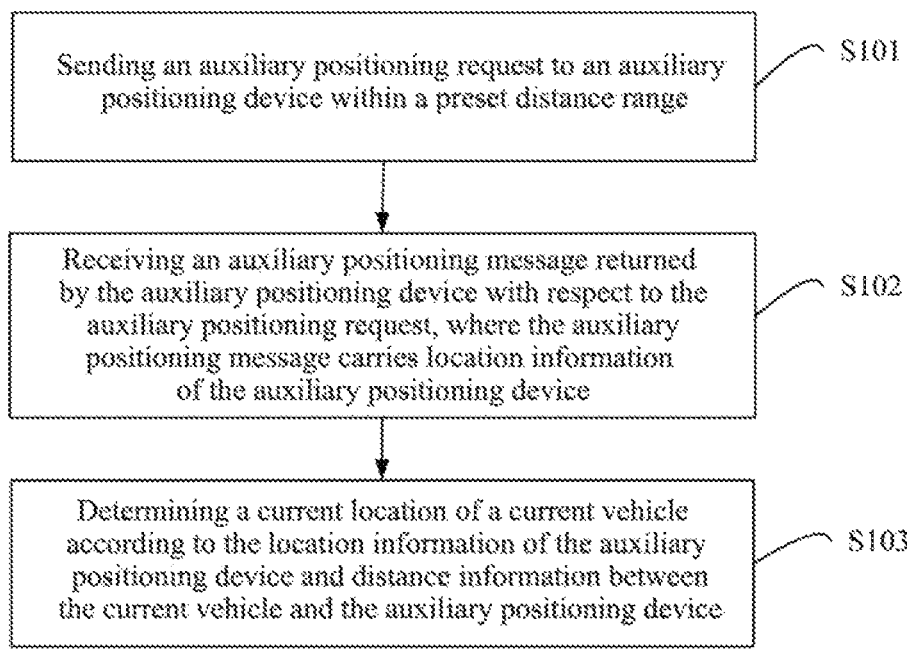
FIG. 1 is a flowchart of a vehicle positioning method according to Embodiment 1 of the present disclosure.

FIG. 1 is a flowchart of a vehicle positioning method according to Embodiment 1 of the present disclosure. The embodiment of the present disclosure provides the vehicle positioning method with respect to the problem that because the vehicle is blocked by an obstacle such as a tunnel, a building, the vehicle fails to receive a satellite positioning signal or the satellite positioning signal is weak, and thus the positioning of the vehicle is inaccurate, or even it is impossible to perform positioning. The method is applied to an on board device mounted in a vehicle, which may be a trip computer, an OBU, and the like. In other embodiments, the method is also applicable to other devices. This embodiment is schematically illustrated by taking the on board device in the vehicle as an example. As shown in FIG. 1, the specific steps of the method are as follows:

Step S101: sending an auxiliary positioning request to an auxiliary positioning device within a preset distance range.

The auxiliary positioning device refers to a device that can learn its current location information and can communicate with the vehicle to be positioned. The preset distance range refers to the maximum communication range in which a vehicle performs a wireless communication, and the auxiliary positioning device located within the preset distance range around the vehicle can communicate with the vehicle wirelessly to assist the vehicle in vehicle positioning.

Step S102: receiving an auxiliary positioning message returned by the auxiliary positioning device with respect to the auxiliary positioning request, where the auxiliary positioning message carries location information of the auxiliary positioning device.

Step S103: determining a current location of the current vehicle according to the location information of the auxiliary positioning device and distance information between the current vehicle and the auxiliary positioning device.

The distance information includes a distance between the current vehicle and the auxiliary positioning device, and relative orientation information of the current vehicle and the auxiliary positioning device.

The distance information between the current vehicle and the auxiliary positioning device can be measured by a ranging apparatus loaded on the current vehicle. The ranging apparatus may be a ranging sensor, or a range finder, or the like, for example, a radio radar (RADAR), a laser radar (LIDAR), a camera ranging apparatus, and the like.

The embodiment of the present disclosure, by obtaining, by the current vehicle, location information of the surrounding auxiliary positioning device by using a wireless communication function, and calculating the current location of the current vehicle according to the location information of the auxiliary positioning device and distance information between the current vehicle and the auxiliary positioning device, can implement vehicle positioning without a satellite positioning signal. The vehicle positioning can be performed when the vehicle is blocked by an obstacle such as a tunnel, a building and the satellite positioning signal cannot be received, improving the accuracy of the vehicle positioning.

Embodiment 2

Figure 2:
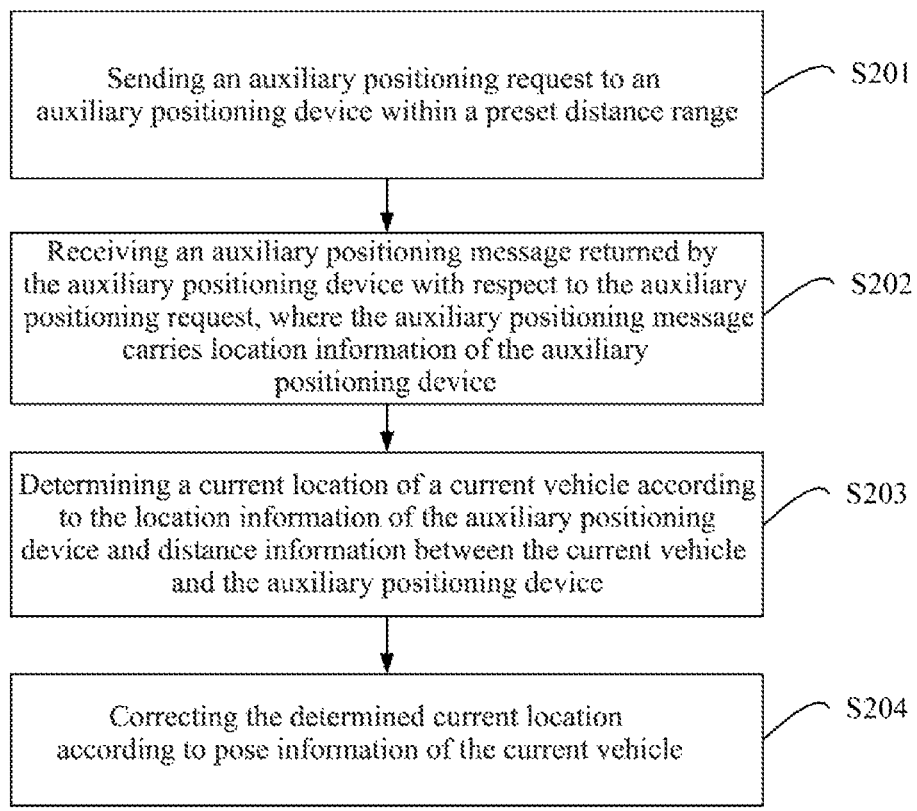
FIG. 2 is a flowchart of a vehicle positioning method according to Embodiment 2 of the present disclosure.

FIG. 2 is a flowchart of a vehicle positioning method according to Embodiment 2 of the present disclosure. On the basis of the above Embodiment 1, in the present embodiment, the determined current location can be further corrected according to the pose information of the current vehicle. As shown in FIG. 2, the specific steps of the method are as follows:

Step S201: sending an auxiliary positioning request to an auxiliary positioning device within a preset distance range.

Optionally, the auxiliary positioning device may be a road side unit that is preset in a preset geographic range and can accurately learn location information where it is located, for example, a road side unit that stores the location information.

In order to improve the accuracy of the vehicle positioning when the vehicle enters areas such as tunnels, urban roads with dense buildings or avenues, one or more road side units may be disposed on both sides of the road within the preset geographic range. The road side unit stores its location information, and can communicate with the vehicle wirelessly to provide its location information to assist the vehicle in vehicle positioning. The number of the road side units disposed in the area can be adjusted according to the size of the area, the communication range of the vehicle and the road side unit, and the like, which is not specifically limited in the present embodiment.

Figure 3:
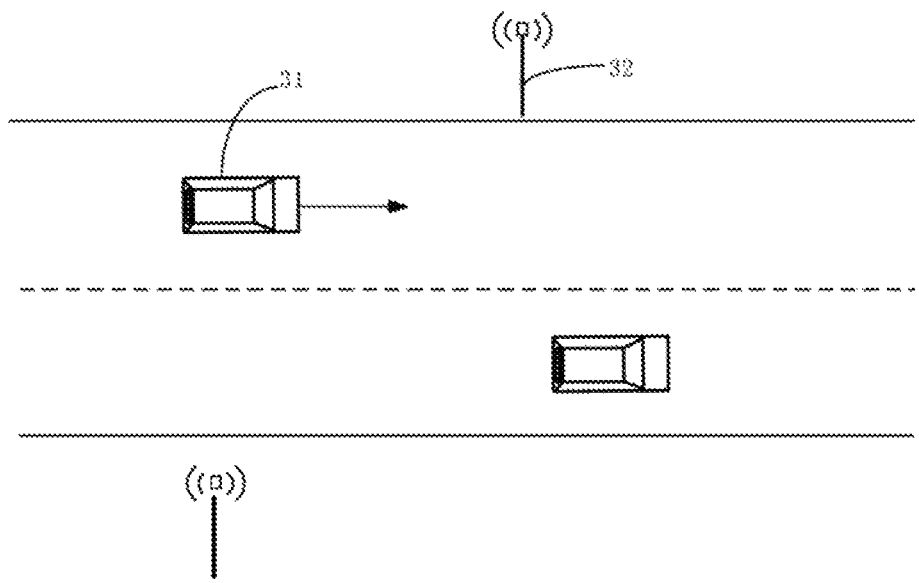
FIG. 3 is a schematic diagram of a vehicle positioning scenario according to an embodiment of the present disclosure.

FIG. 3 is a schematic diagram of a vehicle positioning scenario according to an embodiment of the present disclosure. As shown in FIG. 3, a vehicle 31 is running on a road, the vehicle 31 being the current vehicle to be positioned, and a road side unit 32 is an auxiliary positioning device disposed on one side of the road. When vehicle positioning is required, the vehicle 31 sends an auxiliary positioning request to the road side unit 32 disposed on one side of the road to cause the road side unit 32 to return an auxiliary positioning message to the vehicle 31 according to the received auxiliary positioning request.

In this embodiment, the current vehicle that actively initiates the auxiliary positioning request is a host vehicle, and the other vehicles that assist the host vehicle in vehicle positioning are remote vehicles.

For a host vehicle within a preset geographic range such as urban roads with dense buildings, if a remote vehicle within the preset distance range of the host vehicle can accurately position its location information, and can communicate with the host vehicle wirelessly, it can provide its location information to the host vehicle.

Optionally, the auxiliary positioning device may be a vehicle that can communicate with the host vehicle wirelessly, and can accurately position its current location information.

Figure 4:
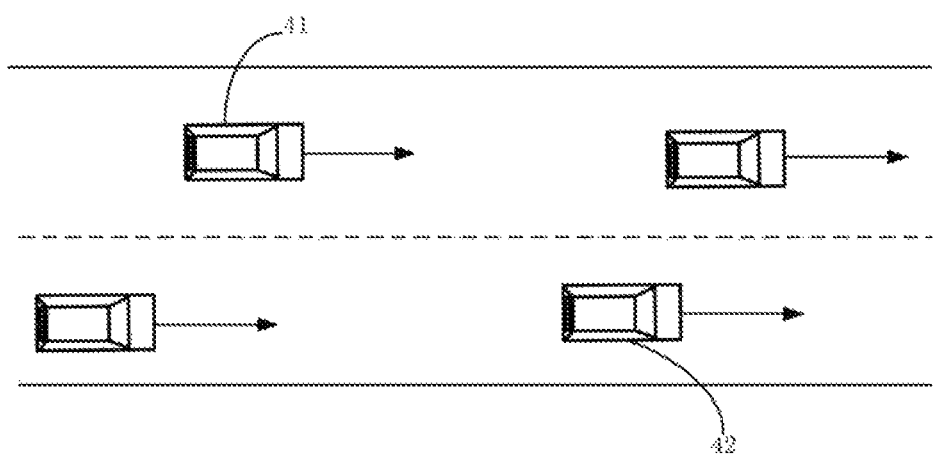
FIG. 4 is a schematic diagram of another vehicle positioning scenario according to an embodiment of the present disclosure.

FIG. 4 is a schematic diagram of another vehicle positioning scenario according to an embodiment of the present disclosure. As shown in FIG. 4, a vehicle 41 is a host vehicle to be positioned. A vehicle 42 is an auxiliary positioning device capable of accurately positioning its location and assisting in positioning of the host vehicle 41, and the vehicle 42 is a remote vehicle. When vehicle positioning is required, the host vehicle 41 sends an auxiliary positioning request to the remote vehicle 42 to cause the remote vehicle 42 to return an auxiliary positioning message to the host vehicle 41 according to the received auxiliary positioning request.

If the auxiliary positioning device is other vehicles, the current vehicle can broadcast the auxiliary positioning request, where the auxiliary positioning request carries an identifier of the current vehicle, so that other vehicles can receive the auxiliary positioning request, and return the auxiliary positioning message to the current vehicle according to the identifier of the current vehicle carried in the auxiliary positioning request.

In addition, for a host vehicle within a preset geographic range such as urban roads with dense buildings, if a remote vehicle within the preset distance range of the host vehicle can accurately position its location information, but it is not guaranteed to be accurate. For example, a remote vehicle can receive a satellite positioning signal and position its current location, but the satellite positioning signal is not very good, and thus the positioning of its current location is not necessarily accurate. At this time, the remote vehicle can also provide its location information to the host vehicle, for example, the vehicle can broadcast its location information. The host vehicle can obtain location information of a plurality of remote vehicles, and perform a multi-point estimation according to the location information of the plurality of remote vehicles and considering a position drift influence caused by V2X delay and network multi-hop, to determine an optimal location of the current vehicle.

Optionally, when vehicle positioning of the current vehicle is required, a satellite positioning signal can be first searched, and when the signal strength of the searched satellite positioning signal is lower than a preset threshold, the auxiliary positioning device is sent to the auxiliary positioning device within the preset distance range for accurately positioning the vehicle with the aid of the auxiliary positioning device. The preset threshold is used to indicate the signal strength of the satellite positioning signal.

Optionally, when it is determined that the current vehicle enters the preset geographic range, the current vehicle directly sends the auxiliary positioning request to the auxiliary positioning device within the preset distance range for accurately positioning the vehicle with the aid of the auxiliary positioning device.

The preset geographic location range in the present embodiment may be a tunnel, a road section densely distributed with buildings or trees in urban roads, and the like, which can be delineated according to the road condition of the road.

Step S202: receiving the auxiliary positioning message returned by the auxiliary positioning device with respect to the auxiliary positioning request, where the auxiliary positioning message carries the location information of the auxiliary positioning device.

The auxiliary positioning device is a device that can learn its current location information and can communicate with the vehicle to be positioned. After receiving the auxiliary positioning request sent by the current vehicle, the auxiliary positioning device acquires its current location information, and feeds back the auxiliary positioning message to the current vehicle with its current location information being carried in the auxiliary positioning message.

The current vehicle receives the auxiliary positioning message returned by the auxiliary positioning device with respect to the auxiliary positioning request, that is, the current vehicle can acquire the location information of the auxiliary positioning device.

Step S203: determining the current location of the current vehicle according to the location information of the auxiliary positioning device and distance information between the current vehicle and the auxiliary positioning device.

The distance information includes the distance between the current vehicle and the auxiliary positioning device, and relative orientation information of the current vehicle and the auxiliary positioning device.

The distance information between the current vehicle and the auxiliary positioning device can be measured by a ranging apparatus loaded on the current vehicle. The ranging apparatus may be a ranging sensor, or a range finder, or the like, for example, a radio radar (RADAR), a laser radar (LIDAR), a camera ranging apparatus, and the like.

After acquiring the distance information between the current vehicle and the auxiliary positioning device, the current location of the current vehicle can be calculated according to the location information of the auxiliary positioning device and the distance information between the current vehicle and the auxiliary positioning device.

Step S204: correcting the determined current location according to pose information of the current vehicle.

During the vehicle positioning process, the current vehicle may keep running. After the current vehicle measures the distance information between the current vehicle and the auxiliary positioning device, the current vehicle further runs a distance. The current vehicle calculates the current location of the current vehicle according to the location information of the auxiliary positioning device and the distance information between the current vehicle and the auxiliary positioning device, where the current location should actually be a first position of the current vehicle when the current vehicle measures the distance information between the current vehicle and the auxiliary positioning device.

Since the time required for the current vehicle to calculate the current location of the current vehicle according to the location information of the auxiliary positioning device and the distance information between the current vehicle and the auxiliary positioning device is very short, which may be of a millisecond level, the distance that the current vehicle runs after the current vehicle measures the distance information between the current vehicle and the auxiliary positioning device and until the current location is calculated is very short and can be ignored.

In order to further improve the accuracy of the current location of the current vehicle, the pose information of the current vehicle can also be acquired in real time. And a displacement of the current vehicle, during a time period from the time at which the distance information between the current vehicle and the auxiliary positioning device is measured until the time at which a location of the current vehicle when it measures the distance information between the current vehicle and the auxiliary positioning device is calculated, can be calculated according to the pose information of the current vehicle. The current location of the current vehicle is calculated according to the displacement of the current vehicle during the time period and the calculated location of the current vehicle when it measures the distance information between the current vehicle and the auxiliary positioning device, so that the current location of the current vehicle positioned in the above step S203 can be corrected.

Optionally, the calculating, according to the pose information of the current vehicle, the displacement of the current vehicle during the time period from the time at which the distance information between the current vehicle and the auxiliary positioning device is measured until the time at which the location of the current vehicle when it measures the distance information between the current vehicle and the auxiliary positioning device is calculated can be implemented in the following manner: drawing, according to the pose information of the current vehicle, a movement trajectory of the current vehicle during the time period from the time at which the distance information between the current vehicle and the auxiliary positioning device is measured until the time at which the location of the current vehicle when it measures the distance information with the auxiliary positioning device is calculated; and calculating the displacement of the current vehicle during the time period according to the movement trajectory of the current vehicle during the time period.

Optionally, the movement trajectory of the current vehicle may also be obtained by other manners using a strategy result of an Inertial Measurement Unit (IMU), a visual odometer, a wheel speed meter and the like loaded on the current vehicle.

In another embodiment of the present disclosure, the current vehicle measures distance information between the current vehicle and the auxiliary positioning device before sending the auxiliary positioning request to the auxiliary positioning device within the preset distance range, sends the auxiliary positioning request to the auxiliary positioning device, where the auxiliary positioning request carries the distance information between the current vehicle and the auxiliary positioning device; the auxiliary positioning device calculates the current location of the current vehicle according to its location information and the distance information between the current vehicle and the auxiliary positioning device, and feeds back the current location of the current vehicle to the current vehicle.

In addition, considering that the current vehicle may run an distance after sending the auxiliary positioning request, the current vehicle can correct the current location of the current vehicle according to the pose information of the current vehicle after receiving the current location of the current vehicle fed back by the auxiliary positioning device. The specific correcting process is similar to the above process of correcting the determined current location according to the pose information of the current vehicle, and will not be repeated here.

The embodiments of the present disclosure, by correcting the determined current location according to pose information of the current vehicle after determining the current location of the current vehicle according to the location information of the auxiliary positioning device and the distance information between the current vehicle and the auxiliary positioning device, further improves the positioning accuracy of the current location of the current vehicle.

Embodiment 3

Figure 5:
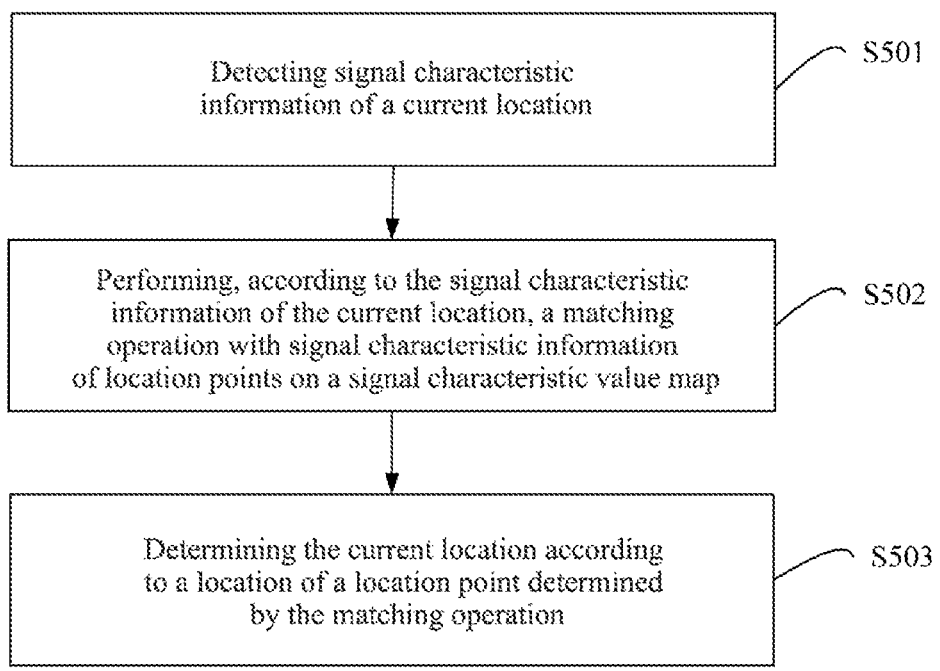
FIG. 5 is a flowchart of a vehicle positioning method according to Embodiment 3 of the present disclosure.

FIG. 5 is a flowchart of a vehicle positioning method according to Embodiment 3 of the present disclosure. The embodiment of the present disclosure provides the vehicle positioning method with respect to the problem that because the vehicle is blocked by an obstacle such as a tunnel, a building, the vehicle fails to receive a satellite positioning signal or the satellite positioning signal is weak, and thus the positioning of the vehicle is inaccurate, or even it is impossible to perform positioning. The method is applied to an on board device mounted in a vehicle, which may be a trip computer, an OBU, and the like. In other embodiments, the method is also applicable to other devices. This embodiment is schematically illustrated by taking the on board device in the vehicle as an example.

Figure 6:
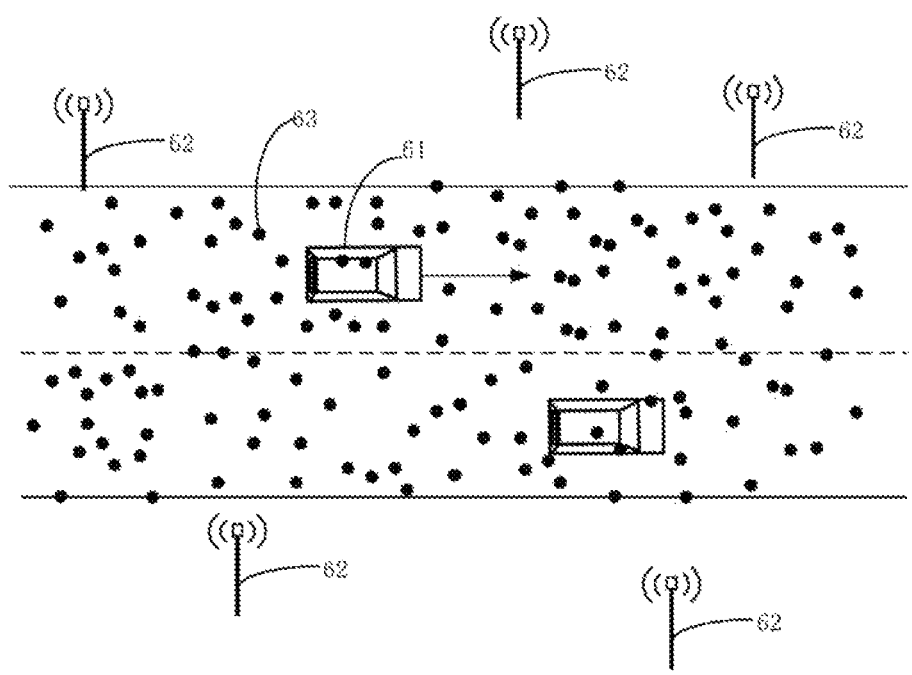
FIG. 6 is a schematic diagram of a vehicle positioning scenario according to an embodiment of the present disclosure.

FIG. 6 is a schematic diagram of a vehicle positioning scenario according to an embodiment of the present disclosure. As shown in FIG. 6, in a preset geographic location range (not shown in the figure), a plurality of road side units 62 are preset, and the road side units 62 transmit signals in real time, and the signals transmitted by the plurality of road side units 62 are superimposed within the preset geographic location range to form a signal field. Due to the multipath effect of the signals, the signal characteristic information detected at any two different locations within the preset geographic location range are different.

In the embodiment, a plurality of location points 63 are selected in advance from the preset geographic location range. At each of the location points 63, signal characteristic information of that location point 63 is measured, and a signal characteristic value map is established according to location information of each of the location points 63 and the signal characteristic information corresponding to each of the location points 63. The signal characteristic value map includes at least the location information of the location points 63 and the signal characteristic information corresponding to the location points 63.

When the signal characteristic value map is established, the location points selected from the preset geographic location range may cover a preset road area within the range or cover the entire preset geographic location range. With respect to the area within the preset geographic location range, the more the location points and the higher the density of the location points, the more accurate the vehicle positioning according to the signal characteristic value map. Therefore, when establishing the signal characteristic value map, try to select enough and uniformly distributed location points.

Optionally, the signal characteristic value map may also be pre-established by a technician through other devices. The signal characteristic value map may be stored on a server, and the on board device can download the signal characteristic value map from the server in advance and store it; or the signal characteristic value map may be stored on the server, and the on board device downloads the signal characteristic value map from the server when required.

Optionally, the on board device, before performing the vehicle positioning, measures the signal characteristic information at each of the location points, and adds a measurement result to the signal characteristic value map to establish the signal characteristic value map. The on board device may directly store the signal characteristic value map on the on board device, and may directly read it when required; or the on board device may submit the established signal characteristic value map to the server, so that other vehicles download it from the server for using when the vehicle positioning is required.

As shown in FIG. 5, the specific steps of the vehicle positioning method are as follows:

Step S501: detecting the signal characteristic information of the current location.

The signal characteristic information includes different types of characteristic information such as power delay distribution information and signal strength.

Optionally, the power delay distribution information may include one or more information related to the power delay distribution such as a power delay distribution, a variance of the power delay distribution, a standard deviation of the power delay distribution, a mathematical expectation of the power delay distribution.

As shown in FIG. 6, a vehicle 61 is a current vehicle, and the vehicle 61 is in the signal field after running into the preset geographic location range. When the vehicle positioning is required, the vehicle 61 detects signal characteristic information of the current location.

Step S502: performing, according to the signal characteristic information of the current location, a matching operation with the signal characteristic information of the location points on the signal characteristic value map.

After detecting the signal characteristic information of the current location, the matching operation is performed on the detected signal characteristic information and the signal characteristic information of each of the location points on the signal characteristic value map according to the pre-established signal characteristic value map.

Optionally, performing the matching operation on the detected signal characteristic information and the signal characteristic information of each of the location points on the signal characteristic value map may be implemented in the following manner:

matching the characteristic information of each type in the detected signal characteristic information with the characteristic information of the corresponding type of each of the location points on the signal characteristic value map, respectively; if there is a location point in the location points on the signal characteristic value map, the characteristic information of each type of which matches the characteristic information of the corresponding type in the detected signal characteristic information, determining that there is a matching point, and the location point is the matching point; if there is no location point in the location points on the signal characteristic value map, the characteristic information of each type of which matches the characteristic information of the corresponding type in the detected signal characteristic information, determining that there is no matching point.

When performing the matching operation of the characteristic information of each type, the characteristic information may be directly compared; or at least one parameter value corresponding to the characteristic information may be calculated according to a preset algorithm, and the at least one parameter value corresponding to the characteristic information is compared respectively.

For example, the detected signal characteristic information includes the signal strength and the power delay distribution. When matching the detected signal characteristic information with the signal characteristic information of one location point, the detected signal strength may be directly compared with the signal strength of that location point; the variance of the detected power delay distribution is compared with the variance of the power delay distribution of that location points, or the standard deviation of the detected power delay distribution is compared with the standard deviation of the power delay distribution of that location point.

In addition, determining whether the two characteristic information (a first information and a second information) of the same type match may be implemented in the following manner:

if the first information and the second information are consistent, determining that the first information and the second information match; if the first information and the second information are inconsistent, determining that the first information and the second information do not match.

Or, if the difference between the first information and the second information is less than a first threshold, determining that the first information and the second information match; if the difference between the first information and the second information is greater than or equal to the first threshold, determining that the first information and the second information do not match. The first threshold may be set according to actual requirements.

Or, if the difference between a parameter value of the first information calculated according to the preset algorithm and a parameter value of the second information calculated according to the same preset algorithm is less than a second threshold, determining that the first information and the second information match; if the difference between the parameter value of the first information calculated according to the preset algorithm and the parameter value of the second information calculated according to the same preset algorithm is greater than or equal to the second threshold, determining that the first information and the second information do not match. The second threshold may be set according to actual requirements.

Optionally, the on board devices for detecting the signal characteristic information on different vehicles may be produced by different manufacturers. Therefore, the signal characteristic information detected by the on board device of different vehicles may be different. The corresponding manufacturer of the on board device may be pre-demarcated, and a correction parameter of the signal characteristic information corresponding to each manufacturer may be given. After detecting the signal characteristic information, the on board device corrects the detected signal characteristic information according to the correction parameter of the signal characteristic information corresponding to its manufacturer.

Step S503: determining the current location according to the location of the location point determined by the matching operation.

According to the matching result of the matching operation in step S502, determining the current location according to the location of the location point determined by the matching operation may be implemented in the following manner:

if there is a matching point, taking the location of the matching point as the current location; or, if there is no matching point, determining the current location according to a plurality of location points, the difference between signal characteristic information of each of the plurality of the location points and the signal characteristic information of the current location being less than a preset threshold.

The preset threshold may be set by the technician according to actual requirements.

Specifically, if there is no matching point, the difference between the signal characteristic information of each of the location points and the signal characteristic information of the current location is calculated.

In the embodiment, the difference between the two signal characteristic information specifically includes: the difference between the characteristic information of at least one type in the two signal characteristic information; or the difference between the parameter values corresponding to the characteristic information of at least one type in the two signal characteristic information. The parameter value corresponding to the characteristic information may be a parameter value obtained by calculating on the characteristic information according to the preset algorithm. For example, the characteristic information may be the power delay distribution, and the parameter value corresponding to the characteristic information may be the variance, the standard deviation, or the mathematical expectation of the power delay distribution.

For example, the signal characteristic information includes the power delay distribution and the signal strength, then the difference of the signal characteristic information may be at least any of the following: 1) the difference of the signal strength; 2) the difference of at least one parameter value corresponding to the power delay distribution, for example, the difference of the variance of the power delay distribution, and/or the difference of the standard deviation of the power delay distribution; 3) the difference of the signal strength and the difference of at least one parameter value corresponding to the power delay distribution.

The determining the current location according to a plurality of location points, the difference between signal characteristic information of each of the plurality of the location points and the signal characteristic information of the current location being less than the preset threshold may be implemented in the following manner:

determining the plurality of location points, the difference between the signal characteristic information of each of the plurality of the location points and the signal characteristic information of the current location being less than the preset threshold; calculating on the plurality of location points using a Bayesian algorithm, or a Euclidean distance algorithm, or a neural network model to determine the current location.

Specifically, a threshold corresponding to characteristic information of each type in the signal characteristic information may be preset, and the thresholds corresponding to characteristic information of different types may be different. In addition, if the parameter values corresponding to characteristic information of a certain type are calculated, regarding the characteristic information of that type, a threshold may be set for parameter values of each type, and the thresholds corresponding to parameter values of different types may be different.

Optionally, the location point satisfying that the difference between the signal characteristic information of the location point and the signal characteristic information of the current location is less than the preset threshold may be a location point satisfying that both the difference of characteristic information of each type and the difference of the parameter values corresponding to the characteristic information of each type included in the difference between the signal characteristic information of the location point and the signal characteristic information of the current location are less than the corresponding threshold.

The embodiment, by detecting signal characteristic information of the current location; performing, according to the signal characteristic information of the current location, the matching operation with signal characteristic information of location points on the signal characteristic value map; and determining the current location according to the location of the location point determined by the matching operation, can implement vehicle positioning without a satellite positioning signal. The vehicle positioning can be performed when the vehicle is blocked by an obstacle such as a tunnel, a building and the satellite positioning signal cannot be received, improving the accuracy of the vehicle positioning.

Embodiment 4

Figure 7:
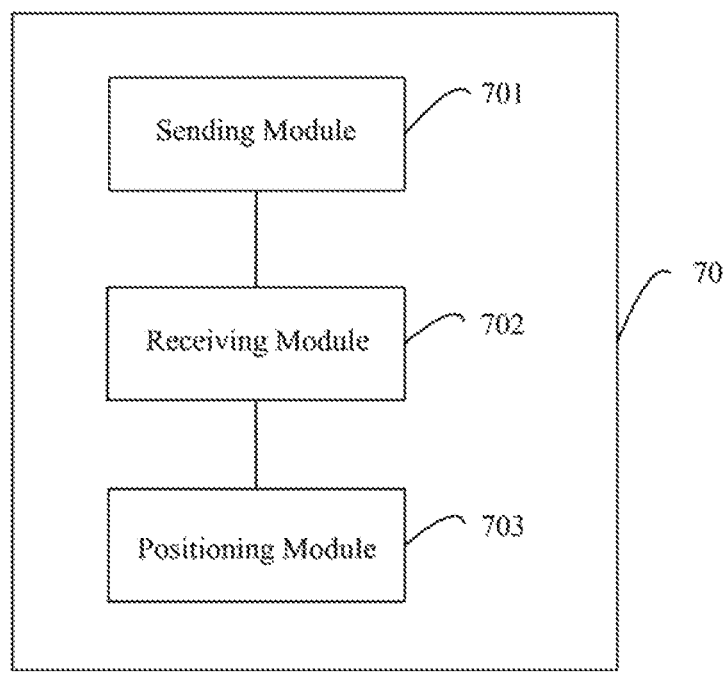
FIG. 7 is a schematic structural diagram of a vehicle positioning apparatus according to Embodiment 4 of the present disclosure.

FIG. 7 is a schematic structural diagram of a vehicle positioning apparatus according to Embodiment 4 of the present disclosure. The vehicle positioning apparatus according to the embodiment of the present disclosure can perform the processing flow according to the embodiments of the vehicle positioning method. As shown in FIG. 7, the apparatus 70 includes a sending module 701, a receiving module 702, and a positioning module 703.

Specifically, the sending module 701 is configured to send an auxiliary positioning request to an auxiliary positioning device within a preset distance range.

The receiving module 702 is configured to receive an auxiliary positioning message returned by the auxiliary positioning device with respect to the auxiliary positioning request, where the auxiliary positioning message carries location information of the auxiliary positioning device.

The positioning module 703 is configured to determine a current location of a current vehicle according to the location information of the auxiliary positioning device and distance information between the current vehicle and the auxiliary positioning device.

The apparatus according to the embodiment of the present disclosure can be specifically used to perform the method embodiment according to the above Embodiment 1, and the specific function will not be described here again.

The embodiment of the present disclosure, by obtaining, by the current vehicle, location information of the surrounding auxiliary positioning device by using a wireless communication function, and calculating the current location of the current vehicle according to the location information of an auxiliary positioning device and distance information between the current vehicle and the auxiliary positioning device, can implement vehicle positioning without a satellite positioning signal. The vehicle positioning can be performed when the vehicle is blocked by an obstacle such as a tunnel, a building and the satellite positioning signal cannot be received, improving the accuracy of the vehicle positioning.

Embodiment 5

Figure 8:
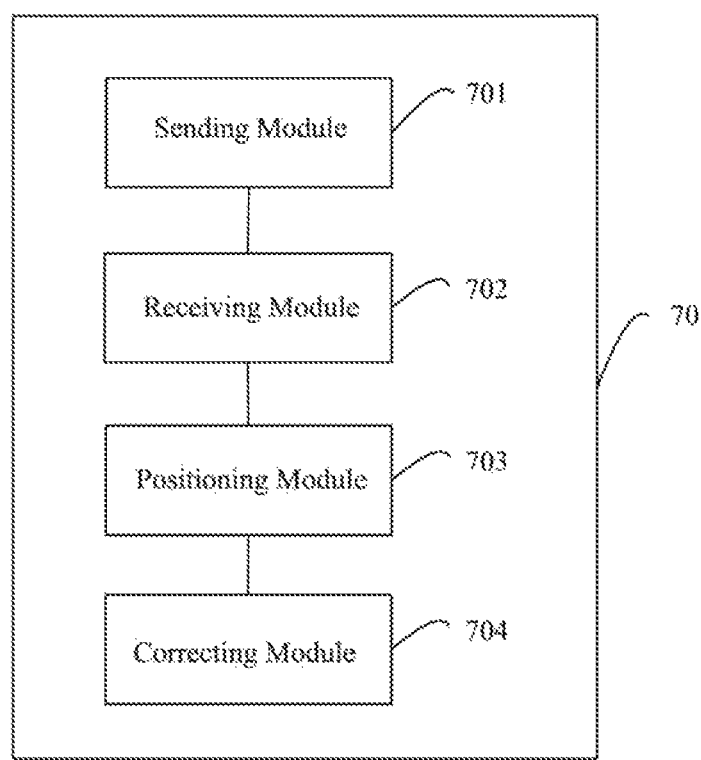
FIG. 8 is a schematic structural diagram of a vehicle positioning apparatus according to Embodiment 5 of the present disclosure.

FIG. 8 is a schematic structural diagram of a vehicle positioning apparatus according to Embodiment 5 of the present disclosure. On the basis of the above Embodiment 4, in this embodiment, as shown in FIG. 8, the apparatus 70 further includes: a correcting module 704.

The correction module 704 is configured to correct the determined current location according to pose information of the current vehicle.

Optionally, the apparatus 70 further includes: an initiating module. The initiating module is configured to determine that signal strength of a searched satellite positioning signal is lower than a preset threshold; or determine that the current vehicle enters a preset geographic location range.

Optionally, the auxiliary positioning device is a road side unit or another vehicle.

Optionally, the sending module 701 is further configured to broadcast the auxiliary positioning request, where the auxiliary positioning request carries an identifier of the current vehicle.

The apparatus according to the embodiment of the present disclosure can be specifically used to perform the method embodiment according to the above Embodiment 2, and the specific function will not be described here again.

The embodiment of the present disclosure, by correcting the determined current location according to pose information of the current vehicle after determining the current location of the current vehicle according to the location information of the auxiliary positioning device and the distance information between the current vehicle and the auxiliary positioning device, further improves the positioning accuracy of the current location of the current vehicle.

Embodiment 6

Figure 9:
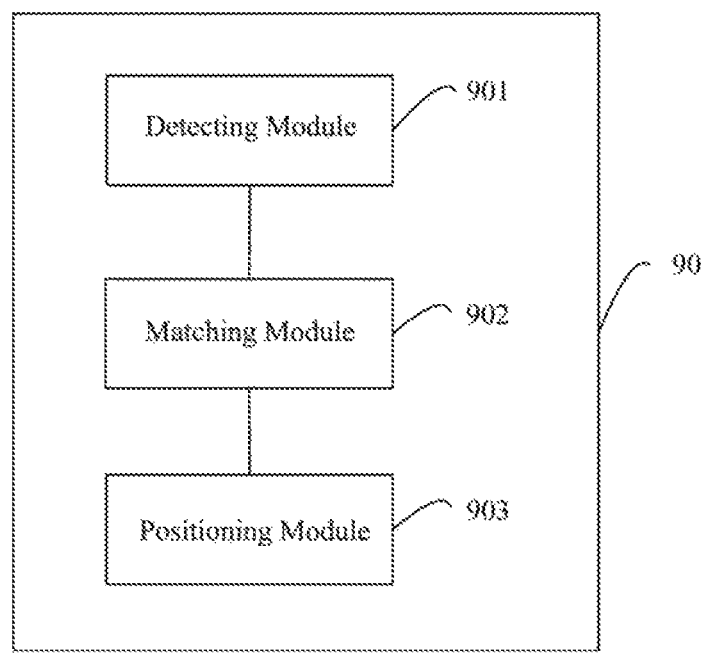
FIG. 9 is a schematic structural diagram of a vehicle positioning apparatus according to Embodiment 6 of the present disclosure.

FIG. 9 is a schematic structural diagram of a vehicle positioning apparatus according to Embodiment 6 of the present disclosure. The vehicle positioning apparatus according to the embodiment of the present disclosure can perform the processing flow according to the embodiments of the vehicle positioning method. As shown in FIG. 9, the apparatus 90 includes a detection module 901, a matching module 902, and a positioning module 903.

Specifically, the detecting module 901 is configured to detect signal characteristic information of a current location.

Optionally, the signal characteristic information includes at least power delay distribution information and signal strength.

The matching module 902 is configured to perform, according to the signal characteristic information of the current location, a matching operation with signal characteristic information of each of location points on a signal characteristic value map.

The positioning module 903 is configured to determine the current location according to a location of a location point determined by the matching operation.

Optionally, the apparatus 90 further includes: a map establishing module. The map establishing module is configured to measure the signal characteristic information at the location points, and add a measurement result to the signal characteristic value map.

Optionally, the positioning module 903 is further configured to:

if there is a matching point, take the location of the matching point as the current location; or, if there is no matching point, determine the current location according to a plurality of location points, the difference between signal characteristic information of each of the plurality of the location points and the signal characteristic information of the current location being less than a preset threshold.

Optionally, the positioning module 903 is further configured to: calculate on the plurality of location points using a Bayesian algorithm, or a Euclidean distance algorithm, or a neural network model to determine the current location.

The embodiment, by detecting signal characteristic information of the current location; performing, according to the signal characteristic information of the current location, the matching operation with signal characteristic information of location points on the signal characteristic value map; and determining the current location according to the location of the location point determined by the matching operation, can implement vehicle positioning without a satellite positioning signal. The vehicle positioning can be performed when the vehicle is blocked by an obstacle such as a tunnel, a building and the satellite positioning signal cannot be received, improving the accuracy of the vehicle positioning.

Embodiment 7

Figure 10:
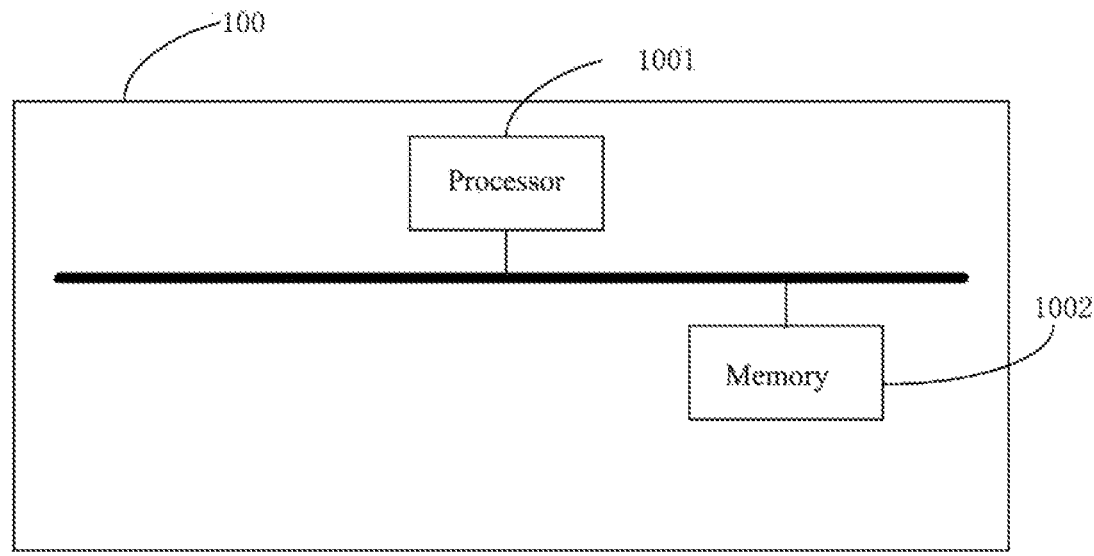
FIG. 10 is a schematic structural diagram of an on board device according to Embodiment 7 of the present disclosure.

FIG. 10 is a schematic structural diagram of an on board device according to Embodiment 7 of the present disclosure.

As shown in FIG. 10, the device 100 includes a processor 1001, a memory 1002, and a computer program stored on the memory 1002 and executable by the processor 1001.

The processor 1001 implements the vehicle positioning method provided in Embodiment 1 or Embodiment 2 when executing the computer program stored in the memory 1002.

The embodiment of the present disclosure, by obtaining, by a current vehicle, location information of the surrounding auxiliary positioning device by using a wireless communication function, and calculating the current location of the current vehicle according to the location information of an auxiliary positioning device and distance information between the current vehicle and the auxiliary positioning device, can implement vehicle positioning without a satellite positioning signal. The vehicle positioning can be performed when the vehicle is blocked by an obstacle such as a tunnel, a building and the satellite positioning signal cannot be received, improving the accuracy of the vehicle positioning.

Embodiment 8

Figure 11:
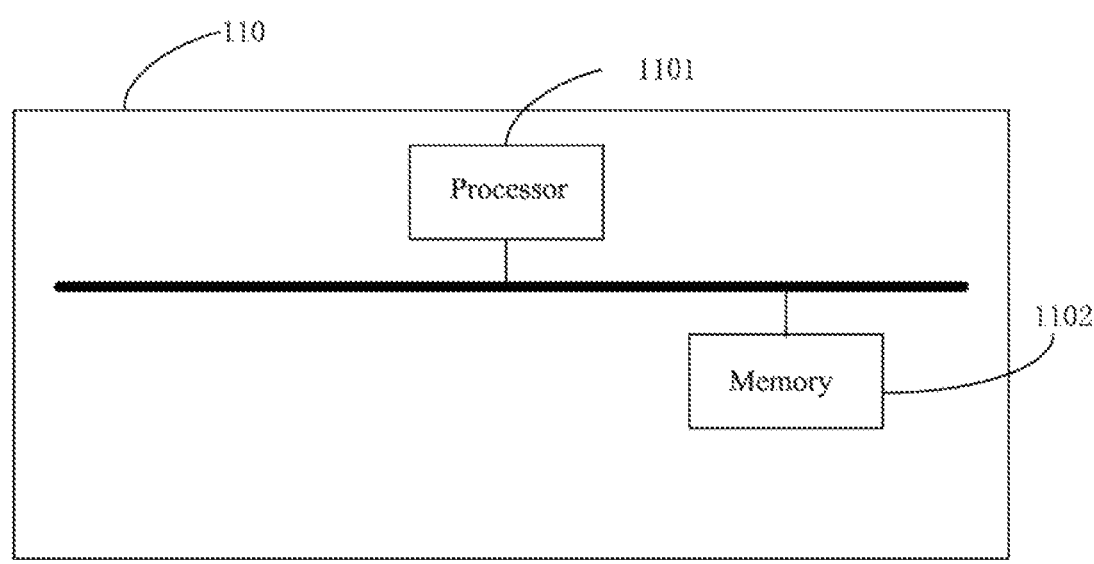
FIG. 11 is a schematic structural diagram of an on board device according to Embodiment 8 of the present disclosure.

FIG. 11 is a schematic structural diagram of an on board device according to Embodiment 8 of the present disclosure. As shown in FIG. 11, the device 110 includes a processor 1101, a memory 1102, and a computer program stored on the memory 1102 and executable by the processor 1101.

The processor 1101 implements the vehicle positioning method provided in Embodiment 3 when executing the computer program stored on the memory 1102.

The embodiment, by detecting signal characteristic information of a current location; performing, according to the signal characteristic information of the current location, a matching operation with signal characteristic information of location points on a signal characteristic value map; and determining the current location according to a location of a location point determined by the matching operation, can implement vehicle positioning without a satellite positioning signal. The vehicle positioning can be performed when the vehicle is blocked by an obstacle such as a tunnel, a building and the satellite positioning signal cannot be received, improving the accuracy of the vehicle positioning.

In addition, an embodiment of the present disclosure further provides a computer readable storage medium, having a computer program stored thereon, for implementing the vehicle positioning method provided by any of the foregoing method embodiments when executed by a processor.

In the several embodiments provided by the present disclosure, it should be understood that the disclosed apparatuses and methods may be implemented in other manners. For example, the apparatus embodiments described above are merely illustrative. For example, the division of the units is only a logical function division. In actual implementation, there may be other division manners, for example, multiple units or components may be combined or integrated into another system, or some features may be ignored or not implemented. In addition, the coupling, direct coupling or communication connection shown or discussed may be an indirect coupling or communication connection through some interfaces, apparatuses or units, and may be in electrical, mechanical or other form.

The units described as separate components may or may not be physically separated, and the components illustrated as units may or may not be physical units, that is, may be located in one place, or may be distributed to multiple network units. Some or all of the units may be selected according to actual requirements to achieve the objectives of the solutions of the embodiments.

In addition, the functional units in respective embodiments of the present disclosure may be integrated into one processing unit, or each unit may exist physically and separately, or two or more units may be integrated into one unit. The above integrated units may be implemented in the form of hardware or in the form of hardware plus software functional units.

The above-described integrated units implemented in the form of software functional units may be stored in a computer readable storage medium. The above software functional units are stored in a storage medium and include instructions for causing a computer device (which may be a personal computer, a server, or a network device, etc.) or a processor to perform part of the steps in the methods of the various embodiments of the present disclosure. The foregoing storage medium includes various mediums capable of storing a program code, such as, a U disk, a mobile hard disk, a read-only memory (ROM), a random access memory (RAM), a diskette, or an optical disk, or the like.

A person skilled in the art can clearly understand that for the convenience and brevity of the description, the division of the functional modules described above is only exemplified. In practical applications, the above functions may be assigned to and completed by different functional modules as required, that is, the internal structure of the apparatus is divided into different functional modules to perform all or part of the functions described above. For the specific working process of the apparatus described above, reference may be made to the corresponding process in the foregoing method embodiments, and details will not be repeated here.

Other embodiments of the disclosure will be apparent to those skilled in the art after considering the specification and practicing the disclosure disclosed herein. The present disclosure is intended to cover any variations, usages, or adaptive modifications of the present disclosure, which are in accordance with the general principles of the disclosure and include common knowledge or conventional technical means in the art that are not disclosed in the present disclosure. The specification and examples are to be regarded as illustrative only, the true scope and spirit of the present disclosure are pointed out by the following claims.

It should be understood that the present disclosure is not limited to the precise structures described above and shown in the drawings, and various modifications and changes may be made without departing from the scope thereof. The scope of the present disclosure is to be limited only by the appended claims.

What is claimed is:

1. A vehicle positioning method, comprising:
   sending an auxiliary positioning request to an auxiliary positioning device within a preset distance range;
   receiving an auxiliary positioning message returned by the auxiliary positioning device with respect to the auxiliary positioning request, wherein the auxiliary positioning message carries location information of the auxiliary positioning device; and
   determining a current location of a current vehicle according to the location information of the auxiliary positioning device and distance information between the current vehicle and the auxiliary positioning device, wherein the distance information comprises a distance between the current vehicle and the auxiliary positioning device, and relative orientation information of the current vehicle and the auxiliary positioning device.

2. The method according to claim 1, wherein the method further comprises:
   correcting the determined current location according to pose information of the current vehicle.

3. The method according to claim 1, wherein before the sending an auxiliary positioning request to an auxiliary positioning device within a preset distance range, the method further comprises:
   determining that signal strength of a searched satellite positioning signal is lower than a preset threshold; or
   determining that the current vehicle enters a preset geographic location range.

4. The method according to claim 1, wherein the auxiliary positioning device is a road side unit or another vehicle.

5. The method according to claim 4, wherein when the auxiliary positioning device is other vehicle, the sending an auxiliary positioning request to an auxiliary positioning device within a preset distance range comprises:
   broadcasting the auxiliary positioning request, wherein the auxiliary positioning request carries an identifier of the current vehicle.

6. A non-transitory computer readable storage medium, having a computer program stored thereon, for implementing the method according to claim 1 when executed by a processor.

7. A vehicle positioning method, comprising:
   detecting signal characteristic information of a current location, wherein the signal characteristic information comprises at least power delay distribution information and signal strength;
   performing, according to the signal characteristic information of the current location, a matching operation with signal characteristic information of location points on a signal characteristic value map; and
   determining the current location according to a location of a location point determined by the matching operation.

8. The method according to claim 7, wherein before performing, according to the signal characteristic information of the current location, a matching operation with signal characteristic information of location points on a signal characteristic value map, the method further comprises:
   measuring the signal characteristic information at the location points, and adding a measurement result to the signal characteristic value map.

9. The method according to claim 7, wherein the determining the current location according to a location of a location point determined by the matching operation comprises:
   when there is a matching point, taking a location of the matching point as the current location; or,
   when there is no matching point, determining the current location according to a plurality of location points, a difference between signal characteristic information of each of the plurality of the location points and the signal characteristic information of the current location being less than a preset threshold.

10. The method according to claim 9, wherein the determining the current location according to a plurality of location points, a difference between signal characteristic information of each of the plurality of the location points and the signal characteristic information of the current location being less than a preset threshold comprises:
    calculating on the plurality of location points using a Bayesian algorithm, or a Euclidean distance algorithm, or a neural network model to determine the current location.

11. A non-transitory computer readable storage medium, having a computer program stored thereon, for implementing the method according to claim 7 when executed by a processor.

12. A vehicle positioning apparatus, comprising:
   a memory, a processor, and a computer program stored on the memory and operable on the processor,
   wherein the processor, when running the computer program, is configured to:
   send an auxiliary positioning request to an auxiliary positioning device within a preset distance range;
   receive an auxiliary positioning message returned by the auxiliary positioning device with respect to the auxiliary positioning request, wherein the auxiliary positioning message carries location information of the auxiliary positioning device; and
   determine a current location of a current vehicle according to the location information of the auxiliary positioning device and distance information between the current vehicle and the auxiliary positioning device, wherein the distance information comprises a distance between the current vehicle and the auxiliary positioning device, and relative orientation information of the current vehicle and the auxiliary positioning device.

13. The apparatus according to claim 12, wherein the processor is further configured to:
   correct the determined current location according to pose information of the current vehicle.

14. The apparatus according to claim 12, wherein the processor is further configured to:
   determine that signal strength of a searched satellite positioning signal is lower than a preset threshold; or
   determine that the current vehicle enters a preset geographic location range.

15. The apparatus according to claim 12, wherein,
   the auxiliary positioning device is a road side unit or another vehicle.

16. A vehicle positioning apparatus, comprising:
   a memory, a processor, and a computer program stored on the memory and operable on the processor,
   wherein the processor, when running the computer program, is configured to:
   detect signal characteristic information of a current location, wherein the signal characteristic information comprises at least power delay distribution information and signal strength;
   perform, according to the signal characteristic information of the current location, a matching operation with signal characteristic information of location points on a signal characteristic value map; and
   determine the current location according to a location of a location point determined by the matching operation.

17. The apparatus according to claim 16, wherein the processor is further configured to:
   measure the signal characteristic information at the location points, and add a measurement result to the signal characteristic value map.

18. The apparatus according to claim 16, wherein the processor is further configured to:
   when there is a matching point, take a location of the matching point as the current location; or,
   when there is no matching point, determine the current location according to a plurality of location points, a difference between signal characteristic information of each of the plurality of the location points and the signal characteristic information of the current location being less than a preset threshold.

19. The apparatus according to claim 18, wherein the processor is further configured to:
    calculate on the plurality of location points using a Bayesian algorithm, or a Euclidean distance algorithm, or a neural network model to determine the current location.

\* \* \* \* \*